US006545632B1

(12) United States Patent
Lyons et al.

(10) Patent No.: US 6,545,632 B1
(45) Date of Patent: Apr. 8, 2003

(54) RADAR SYSTEMS AND METHODS

(75) Inventors: Geoffrey Lyons, Great Eccleston (GB); Michael Pywell, Preston (GB)

(73) Assignee: BAE Systems plc, Farnborough (GB)

( * ) Notice: Subject to any disclaimer, the term of this patent is extended or adjusted under 35 U.S.C. 154(b) by 42 days.

(21) Appl. No.: 09/719,403

(22) PCT Filed: Oct. 11, 2000

(86) PCT No.: PCT/GB00/03888

§ 371 (c)(1),
(2), (4) Date: Jan. 5, 2001

(87) PCT Pub. No.: WO01/27654

PCT Pub. Date: Apr. 19, 2001

(30) Foreign Application Priority Data

Oct. 13, 1999 (GB) ................................................ 9924079

(51) Int. Cl.⁷ ........................... G01S 13/78; G01S 7/40
(52) U.S. Cl. ......................................... 342/45; 342/13
(58) Field of Search .......................... 342/13, 14, 15, 342/16, 17, 18, 19, 45

(56) References Cited

U.S. PATENT DOCUMENTS

| | | | | |
|---|---|---|---|---|
| 3,905,035 A | * | 9/1975 | Krumboltz et al. | 342/14 |
| 3,949,397 A | * | 4/1976 | Wagner et al. | 342/45 |
| 4,217,550 A | * | 8/1980 | Blassel et al. | 455/1 |
| 4,593,288 A | | 6/1986 | Fitzpatrick | 343/705 |
| 4,876,545 A | | 10/1989 | Carlson et al. | 342/14 |
| 5,128,684 A | * | 7/1992 | Brown | 342/189 |
| 5,142,288 A | * | 8/1992 | Cleveland | 342/45 |
| 5,223,837 A | * | 6/1993 | Grossman | 342/13 |
| 5,247,307 A | * | 9/1993 | Gandar et al. | 342/192 |
| 5,327,145 A | * | 7/1994 | Jelinek | 342/453 |
| 5,379,043 A | * | 1/1995 | Bishop | 342/454 |
| 5,554,990 A | | 9/1996 | McKinney | 342/36 |
| 5,819,164 A | * | 10/1998 | Sun et al. | 455/106 |
| 5,822,430 A | * | 10/1998 | Doud | 380/260 |
| 2002/0080059 A1 | * | 6/2002 | Tran | 342/29 |

FOREIGN PATENT DOCUMENTS

| | | |
|---|---|---|
| EP | 0 520 666 | 12/1992 |
| WO | 97/08839 | 3/1997 |

OTHER PUBLICATIONS

Patent Abstracts of Japan vol. 012, No. 046 (P–665), Feb. 1988 & JP 62–192680A (Mitsubishi Elecctric Corp), Aug. 1987.

\* cited by examiner

*Primary Examiner*—John B. Sotomayor
(74) *Attorney, Agent, or Firm*—Nixon & Vanderhye P.C.

(57) ABSTRACT

A mobile radar system including Electronic Support Measures (ESM) which is adapted to detect and decode Identify Friend or Foe (IFF) signals. The system includes means for decoding or decrypting received IFF signals. The system uses an Electronic Counter Measure (ECM) transmitter which is adapted to transmit IFF response and interrogation signals. The IFF signals to be transmitted can be encrypted. Integrating IFF means into the ESM and ECM components results in mass and volume savings due to shared use of the transmitting and receiving resources. As the IFF signals are transmitted using ESM antennas, they can be directed towards a particular aircraft, thereby reducing spurious transmissions.

15 Claims, 2 Drawing Sheets

RADAR SYSTEMS AND METHODS

BACKGROUND OF THE INVENTION

1. Field of the Invention

This invention relates to systems and methods providing a capability for IFF transponder and interrogator functions in addition to ESM/ECM functions, and in particular but not exclusively to such systems and methods for aircraft. Such systems and methods may also find applications in other vehicles for land, air, sea or space use.

2. Discussion of Prior Art

For Air Traffic Control (ATC) purposes, civil and military aircraft are required to be fitted with Identify Friend or Foe (IFF) transponders. These transponders reply automatically, with information such as height, speed, aircraft identification code, when they receive a Radio Frequency (RF) request from a ground station—usually located at airports.

In times of conflict this identity reporting is used to prevent fratricide and to aid friendly assets in gaining a picture or awareness of the battlespace. In order to prevent enemy forces from exploiting this identity reporting, the interrogation signals are coded or, in the case of more modern systems, encrypted.

A transponder is also required to satisfy civil air traffic control requirements; in this case there are no requirements for coding or encryption other than that the transponder replies with the identify of the aircraft and its current altitude. Military IFF transponders are capable of operating in the civil ATC modes. An emergency mode is also provided which will enable the transponder to act as a distress beacon in the event of pilot ejection or similar emergencies.

A transponder comprises a transmitter/receiver unit, upper and lower transmit/receive antennas and a control unit, as exemplified in FIG. 1 of the accompanying drawings. By international accord, they operate on a transmit frequency band centred on 1090 MHz and a receive frequency band centred on 1030 MHz, and in each case the bandwidth is normally less than 10 MHz.

The military purpose of IFF is identification of friendly aircraft by the use of identification codes on the transmission and reply. In this case, called IFF 'Interrogation', an aircraft can be requested by either a ground station, land/sea vehicle or another aircraft fitted with an Interrogator to reply to a coded request for identification. Only friendly aircraft who know the code of the day can provide the correct response to the Interrogation. On most fighter aircraft the IFF Interrogator, which requires extra 'black boxes' and antennas to those of the IFF Transponder, is often enacted by mounting the IFF Interrogator antennas on the main nose radar dish. In this way, when an aircraft is detected by that radar, it can be selectively interrogated by the directional nose radar dish, without broadcasting the interrogating aircraft's position through the omnidirectional transmissions typical of Transponder systems. FIG. 2 of the accompanying drawings illustrate a typical such arrangement.

All modern military aircraft have either a Radar Warning Receiver (RWR) or a more capable RWR called Electronic Support Measures (ESM). The purpose of both is to receive, identify and classify RF emissions received at the aircraft; to notify the crew of the direction from which the RF signals came; and, if classified as a 'threat', to enable or initiate appropriate crew warnings and counter measures. Such countermeasures can include RF Electronic Countermeasures (ECM or 'jammers'). Most military aircraft especially fighters and bombers, and including helicopters, have ECM capability, either podded (carried under a wing) or internal to the fuselage. FIG. 3 of the accompanying drawings gives a block diagram of a typical fighter ESM/ECM system.

An ESM receiver is essentially a sensitive radio receiver which is rapidly scanned over a wide range of frequencies in order to detect radar signals incident on the aircraft; detected signals are analysed on a pulse by pulse basis to determine, by comparison with a stored library of emitter characteristics, the source of the radar signals. The antenna arrangement associated with the ESM receiver enables the direction from which the signals are arriving to be measured.

The information derived by the ESM receiver is presented graphically to the crew and, if a threat emitter is detected, may be used to cue a jammer or electronic countermeasures (ECM) system to disrupt the operation of the threat. The ECM system consists of an RF transmitter and associated antennas which can be tuned to the frequency of the detected threat and can transmit a variety of complex signals generated by a "techniques generator". More recent ECMs are capable of directing the jamming signal towards the threat system in order to maximise their effectiveness.

There is a potential operational problem associated with an IFF transponder as described above due to the fact that transponder signals are broadcast in all directions. The scenario should be considered where a first aircraft is operating covertly and emitting no radio signals in order to minimise the likelihood of an enemy detecting its presence. Another friendly asset, possibly a coalition aircraft or surface based radar, interrogates the first aircraft with a valid IFF signal and its transponder broadcasts its identity thus alerting the enemy to its presence. It should be noted that the enemy do not have to decode the transponder signal in order to detect its presence and, possibly, its bearing. This problem could be averted by the first aircraft suppressing the operation of its transponder; however, this may incur the risk of engagement by the "friendly" asset and negates the value of having an IFF system in the first place.

SUMMARY OF THE INVENTION

We have designed a system in which the IFF Transponder and Interrogator functionality are subsumed within the ESM/ECM equipment. The ESM is used to detect and decode IFF interrogations and to use the associated ECM to transmit the appropriate reply, preferably in the direction of the interrogator. As the replies can be directed specifically towards the interrogator, spurious emissions are minimised, thereby assisting in keep the presence of the aircraft covert. The functionality associated with the IFF decoder and an encryption computer are also preferably incorporated into the ESM and ECM equipment, as well as appropriate interfaces for receiving cryptography information and a control panel.

This system provides significant benefits as a result of the removal of the IFF Transponder and Interrogator boxes and antennas, both for the manufacture of the aircraft and the operator. The system benefits from reduced weight, volume, power and cooling requirements, and cost. The initial and life cycle costs of the aircraft may be reduced, and the system may provide improved aircraft reliability. The aircraft maintenance effort required may also be reduced. The system also provides substantial tactical advantages. Thus the system assists in reducing the electronic signature of the aircraft, giving it improved survivability because of reduced detectability by opposing ground/airborne threat radars. The system also releases space on existing aircraft for other function and/or performance improvements.

Accordingly, in one aspect, this invention provides a radar system for a station, said system comprising:

at least one antenna means for passing signals in the radio frequency waveband;

Identify Friend or Foe (IFF) transponder means for receiving and responding to requests from a remote transmitter via said antenna means;

IFF interrogator means for selectively interrogating in use a remote transmitter via said antenna means;

Radar Warning receiving (RWR) means for processing radio frequency emissions received by said antenna means to identify potential threats; and Electronic Countermeasure (ECM) means for generating electronic countermeasures signals and for passing said signals to said antenna means for transmission.

The arrangement preferably includes control means for controlling the passage of signals between said IFF transponder means, said IFF interrogator means, said RWR means, said ECM means and said antenna means respectively.

The number, type and configuration of the antennas making up the antenna means may vary widely according to the particular application. Thus the system may comprise separate transmit and receive antennas, and respective separate forward facing and rearward facing sets of one or more antennas may be provided to allow coverage of the forward and rearward hemispheres. The provision of forward and rearward looking transmit antennas gives the ability to perform rear hemisphere IFF interrogation, which is not present in any of the earlier systems described above. This is particularly useful in a military context when the vehicle or station fitted with the system is past the forward edge of the battle area.

The transmit antennas are preferably highly directional or capable of being operated highly directionally so that responses from the IFF transponder are narrow beam, to provide better threat avoidance. The system can also provide, compared with conventional IFF responses, a much finer spatial response to military IFF interrogations, again providing better threat avoidance.

The antenna means may comprise one or more phased array antennas.

The receive antenna means preferably has a direction of arrival performance typically of 1 degree r.m.s. error.

The system may also include navigational and similar apparatus using the same antenna means. Thus said system may include microwave landing systems (MLS) means under the control of said control means and receiving signals from said antenna means. Likewise the system may include distance measuring equipment controlled by said control means, with signals therefor being passed by said antenna means.

Still further, said system may include radio communications apparatus, with signals being passed by said antenna means.

The system preferably also includes means for detecting and displaying IFF requests/responses on display means, and/or for using data identifying said IFF requests/responses for threat assessment.

Whilst the system may be used in a number of different applications e.g. land, air or sea, it has been designed with particular reference to use on board an aircraft. Accordingly the invention extends to an aircraft radar system as defined above and also to aircraft fitted with such a system.

The invention also extends to a method of providing IFF transponder, IFF interrogator, ECM and RWR/ESM facilities for a mobile station, which comprises providing antenna means for transmitting and receiving radiation, passing IFF transponder requests and responses via said antenna means, passing IFF interrogation requests via said antenna means, passing RWR/ESM signals via said antenna means and passing ECM signals via said antenna means.

Whilst the invention has been described above, it extends to any inventive combination of the features set out above or in the following description.

BRIEF DESCRIPTION OF THE DRAWINGS

The invention may be performed in various ways, and an embodiment thereof will now be described by way of example only, reference being made to the accompanying drawings, in which.

DETAILED DISCUSSION OF EMBODIMENTS

Figure 1:
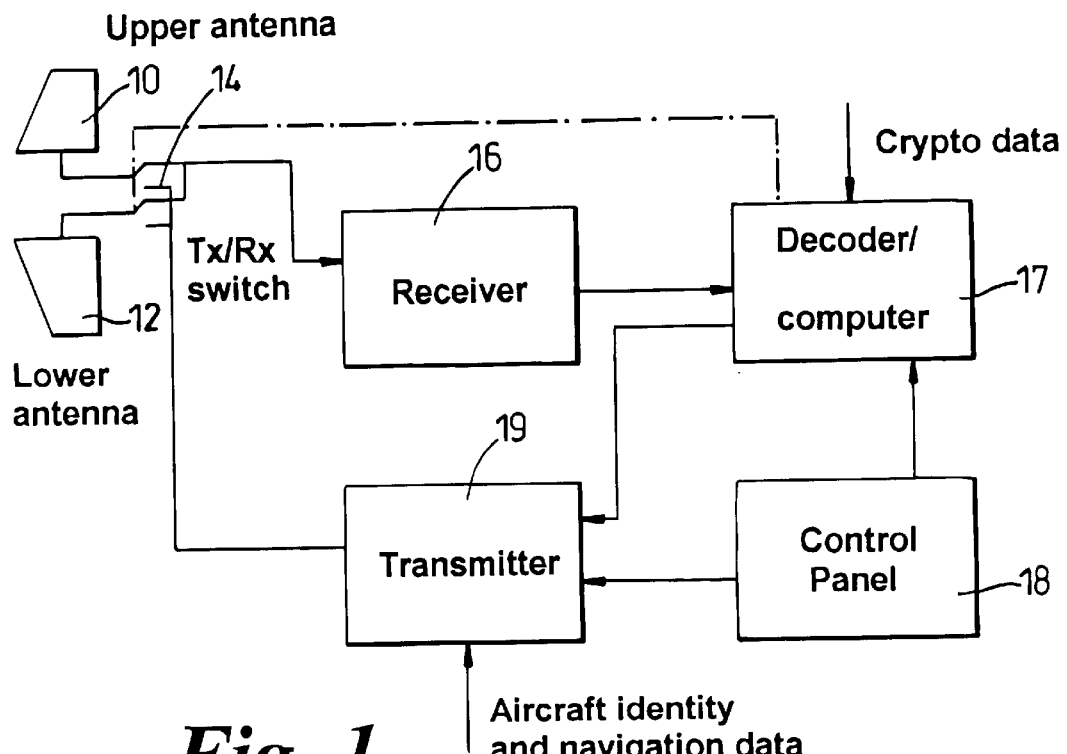
FIG. 1 is a block diagram of a conventional IFF transponder.
Figure 2:
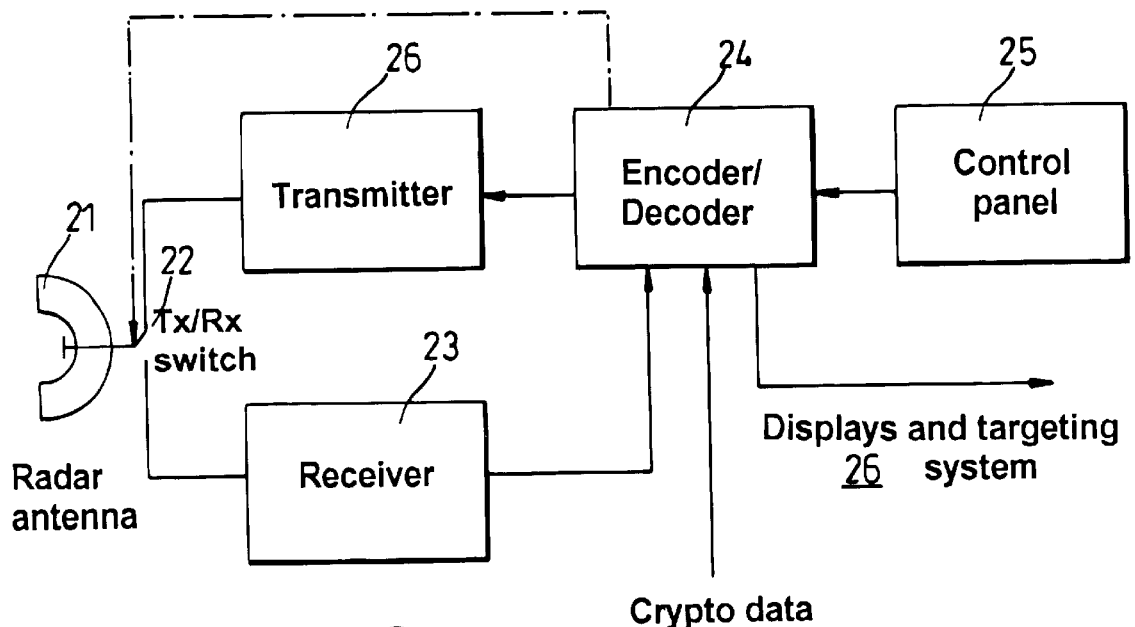
FIG. 2 is a block diagram of a conventional IFF interrogator.
Figure 3:
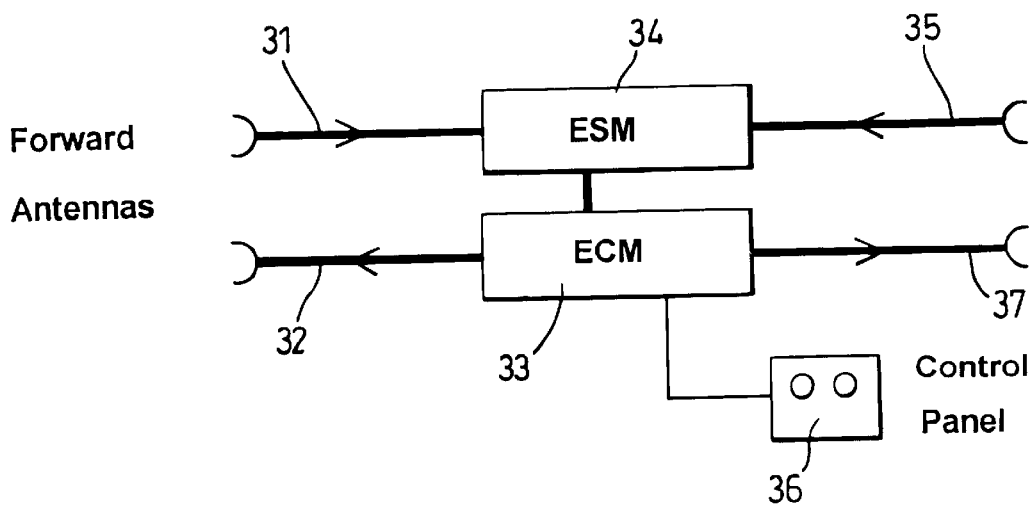
FIG. 3 is a block diagram of a conventional ESM/ECM system.

The arrangements shown in the Figures are all intended for use on board an aircraft although it is emphasised that these could be used on other land, sea or air-based applications. Referring briefly to FIGS. 1 to 3, in FIG. 1, an aircraft is provided with upper and lower omnidirectional antennas 10 and 12 respectively. The two antennas 10, 12 are connected to a transmit/receive switch 14. The switch 14 determines whether the antennas 10, 12 are to be used to transfer signals which they receive to a receiver 16 or whether the antennas are to be used to transmit a signal which they receive from a transmitter 19. Both the receiver 16 and transmitter 19 are connected to a decoder computer 17. Alternatively, all signals which are received/transmitted by the antennas 10, 12 may be processed directly by the decoder 17 as soon as they are received or just prior to being transmitted. If the decoder 17 is configured to encrypt data then it may also receive cryptography data for performing the encryption/decryption operations. Signals are passed between receiver 16 and transmitter 19, via the decoder 17, under the control of a control panel 18.

In the IFF interrogator arrangement of FIG. 2, the IFF interrogator antenna or antennas 21 are mounted on the main nose radar dish. The antennas 21 are typically high gain steerable antennas. They are steerable so that the interrogation signal may be directed towards a particular target aircraft and the return signal from its transponder. The antennas 21 are connected to a transmitter/receiver switch 22, which determines whether the antennas are used to transfer signals which they receive to a receiver 23 or whether the antennas are to be used to transmit a signal which passed from a transmitter 26. Both the receiver 23 and the transmitter 26 are connected to an encoder/decoder 24. The encoder/decoder 24 is capable of receiving cryptography data for performing encryption/decryption operations. The encoder/decoder 24 is connected to a display and targeting system 26, so that information received in response to the IFF interrogation signal can be shown on a screen and possibly to aim a weapon if the no response to an interrogation is received.

The IFF interrogator operates by transmitting a coded or encrypted signal, as determined by the setting on control panel 25, at a frequency of 1030 MHz and a peak power of 1 kW+/−6 dB. Transponder replies are received on a frequency of 1090 MHz and are decoded or decrypted in order to deduce the identity of the target aircraft. The identify information will be displayed, together with the range and bearing of the target, on the radar display 26 of the aircraft. An enemy aircraft should not normally respond with a valid identity signal and would, in the absence of other information, be identified as unknown.

Referring to FIG. 3, the illustrated ESM/ECM system comprises forward receive and transmit antennas 31, 32 respectively and rearward receive and transmit antennas 35 and 37 respectively. The transmit antennas receive signals from an ECM box 33 and the receive antennas 0 pass signals to an ESM box 34, the ECM and ESM boxes communicating with each other and being under the control of a control panel 36.

Figure 4:
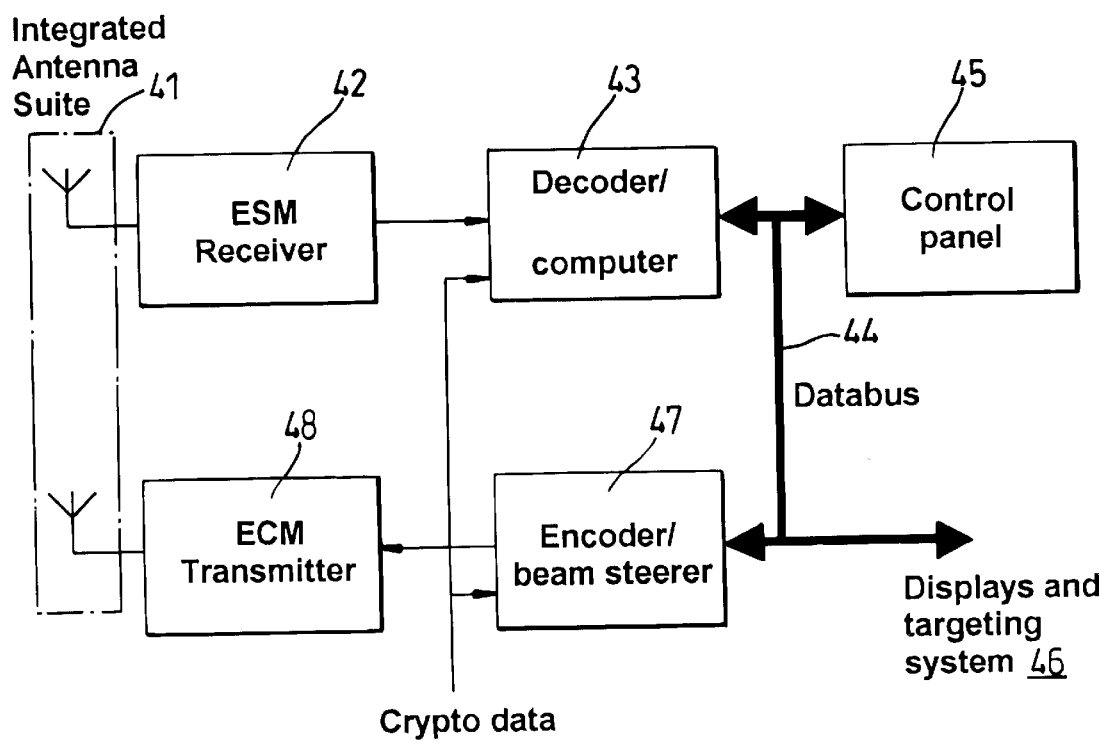
FIG. 4 is a block diagram of an ESM/ECM-based IFF transponder/interrogator system in accordance with this invention.

Referring now to FIG. 4, the ESM/ECM-based IFF transponder/interrogator in accordance with this invention is installed on an aircraft (not shown) which has an integrated antenna suite 41. The antenna suite 41 is connected to an ESM receiver 42 and an ECM transmitter 48. The ESM receiver 42 incorporates IFF receiver means, operating in a manner which is compatible with conventional IFF systems. The ECM transmitter 48 includes means for sending IFF interrogation signals and response signals to an IFF interrogation compatible with conventional IFF systems. The signals received by the antenna suite 41 are passed to a decoder computer 43 via an ESM receiver 42.

A databus 44 connects the decoder 43 to a control panel 45, as to well as an encoder/beam steerer 47 and displays/targeting system 46. Control panel 45 is used to control the transfer of data received by the ESM receiver so that it is decoded or decrypted by decoder 43. Decoder 43 and encoder 47 are capable of receiving cryptography data if encryption/decryption is used. The resulting data is transferred by databus 44 to be displayed on screen 46, and possibly used to aim a weapon at an unidentified aircraft using the targeting system.

The control panel 45 also controls the transmission of IFF interrogation and response signals through the antenna suite 41. The IFF signal can be encoded/encrypted using component 47 before being transferred to the ECM transmitter 48 for transmission. Component 47 can also direct the antenna used for transmission towards a particular aircraft.

If required, other systems may also be connected to the antennas, for example microwave landing system boxes (MLS), distance measuring equipment (DME) boxes, and communications equipment. Also the display may be used to indicate to the aircrew IFF requests/responses.

The integrated antenna suite 41 may be augmented by supplementary antennas covering beam-on aspects only, thereby provided greater angular coverage from the ECM.

Few ESM receivers designed for the self protection of combat aircraft have a frequency coverage which extends down to 1 GHz; the situation is even worse for ECMs which, typically, do not operate below about 4 GHz. ESM-ECM systems which do cover the IFF frequency band are currently limited to aircraft designed specifically for electronic warfare (EW) tasks such as stand off or escort jamming. The angular coverage of self protection systems also tends to be limited at present; while ESM systems generally provide 360° azimuth coverage this is much less common for ECM.

The above factors limit the practicality of the described approach for current aircraft; however, modern aircraft, especially the higher value platforms, designed for covert operation can employ low observable airframes, and may present an opportunity to incorporate a system of the type described. The low observable technologies, as apparent on aircraft such as the F117, B1-B and B2, are optimised to minimise the likelihood of detection by radars operating at frequencies in excess of about 8 GHz. To counter this, the radars associated with ground and surface based surveillance and weapon systems are tending towards operation at lower frequencies and this, in turn, is driving the frequency coverage requirements for ESM-ECM systems down to 1 GHz and below. The problem caused by limited angular coverage from the ECM could be overcome by the inclusion of supplementary antennas covering beam-on aspects only.

The integrated antenna suite 41 may be augmented by supplementary antennas covering beam-on aspects only, thereby providing greater angular coverage from the ECM.

If the angular selectivity of the ECM antennas is adequate, the IFF interrogator function could be provided by the ECM as an alternative to the main radar should this be desired.

What is claimed is:

1. A radar system for a station, said system comprising:
    at least one antenna means for passing signals in the radio frequency waveband;
    Identify Friend or Foe (IFF) transponder means for receiving and responding to requests from a remote transmitter via said antenna means;
    IFF interrogator means for selectively interrogating a remote transmitter via said antenna means;
    Radar Warning Receiving (RWR) means for processing radio frequency emissions received by said antenna means to identify potential threats; and
    Electronic Countermeasure (ECM) means for generating electronic countermeasures signals and for passing said signals to said antenna means for transmission.

2. A radar system according to claim 1, which further includes control means for controlling the passage of signals between said IFF transponder means, said IFF interrogator means, said RWR means, said ECM means and said antenna means respectively.

3. A radar system according to claim 1, wherein the RWR means includes an Electronic Support Measures (ESM) receiver.

4. A radar system according to claim 1, wherein said antenna means comprises separate transmit and receive antennas.

5. A radar system according to claim 1, which includes separate forward facing and rearward facing sets of one or more antennas to allow coverage of the forward and rearward hemispheres.

6. A radar system according to claim 4, wherein each transmit antenna is directional or capable of being operated directionally so that responses from the IFF transponder are narrow beams.

7. A system according to claim 1, wherein the antenna means comprises one or more phased array antennas.

8. A system according to claim 4, wherein each receive antenna means has a direction of arrival performance typically of 1 degree r.m.s. error.

9. A system according to claim 3, wherein the antenna means includes antennas covering beam-on aspects.

10. A system according to claim 1, which further includes one or more of:
    Microwave landing systems (MLS) means;
    distance measuring equipment; and
    radio communications apparatus.

11. A radar system according to claim 1, which includes means for detecting and displaying IFF requests/responses or display means, and/or for using data identifying said IFF requests/responses for threat assessment.

12. A method of providing IFF transponder, IFF interrogator, ECM and RWR/ESM facilities for a station, which comprises providing shared antenna means for transmitting and receiving radiation, passing IFF transponder requests and responses via said antenna means, passing IFF interrogation requests via said antenna means, passing RWR/ESM signal via said antenna means and passing ECM signals via antenna means.

13. A radar system including:
an Electronic Support Measures (ESM) receiver means having at least one antenna;
an Electronic Counter Measures (ECM) transmitter means having at least one antenna,
wherein the antenna of the ESM receiver means is capable of operating at around 1 GHz, the ESM means including means for decoding Identify Friend or Foe (IFF) signals, and
the antenna of the ECM transmitter means is capable of operating at around 1 GHz, the ECM transmitter means including means for transmitting IFF interrogation signals and IFF response signals in response to receive IFF interrogation signals.

14. A radar system according to claim 13, further including means for decrypting IFF signals received by the ESM receiver and means for encrypting IFF signals to be transmitted by the ECM means.

15. A radar system according to claim 13, further including means for steering the antenna of the ECM transmitter towards a selected target.

* * * * *